United States Patent [19]

Arroyo

[11] Patent Number: 4,818,060
[45] Date of Patent: Apr. 4, 1989

[54] OPTICAL FIBER BUILDING CABLES

[75] Inventor: Candido J. Arroyo, Lilburn, Ga.

[73] Assignee: American Telephone and Telegraph Company, AT&T Bell Laboratories, Murray Hill, N.J.

[21] Appl. No.: 32,889

[22] Filed: Mar. 31, 1987

[51] Int. Cl.⁴ ............................................. G02B 6/44
[52] U.S. Cl. .................................................. 350/96.23
[58] Field of Search ..................................... 350/96.23

[56] References Cited

U.S. PATENT DOCUMENTS

| | | | |
|---|---|---|---|
| 4,150,249 | 4/1979 | Pedersen | 174/36 |
| 4,235,511 | 11/1980 | Yonechi | 350/96.23 |
| 4,653,851 | 3/1987 | Pedersen et al. | 350/96.23 |

Primary Examiner—William L. Sikes
Assistant Examiner—Phan T. Heartney
Attorney, Agent, or Firm—Edward W. Somers

[57] ABSTRACT

A flame and smoke resistant optical fiber cable (20) having a relatively small diameter includes a core comprising a ribbon array or a plurality of individual fibers and a sheath system. The sheath system includes an impregnated fiber glass tape (35) which has been wrapped about the core. The tape is impregnated with a solution system which comprises a micaceous constituent, a fluoropolymer constituent and a lubricant such as silicone. The impregnated system provides the tape and hence the cable with unexpectedly superior fire retardant and smoke resistance properties so that the cable is suitable for plenum and riser use. Advantageously, the thickness of the tape impregnated with such a system is relatively thin which is helpful in maintaining a relatively small diameter for the cable. An all dielectric strength member system is disposed between the tape and a plastic jacket (37).

17 Claims, 5 Drawing Sheets

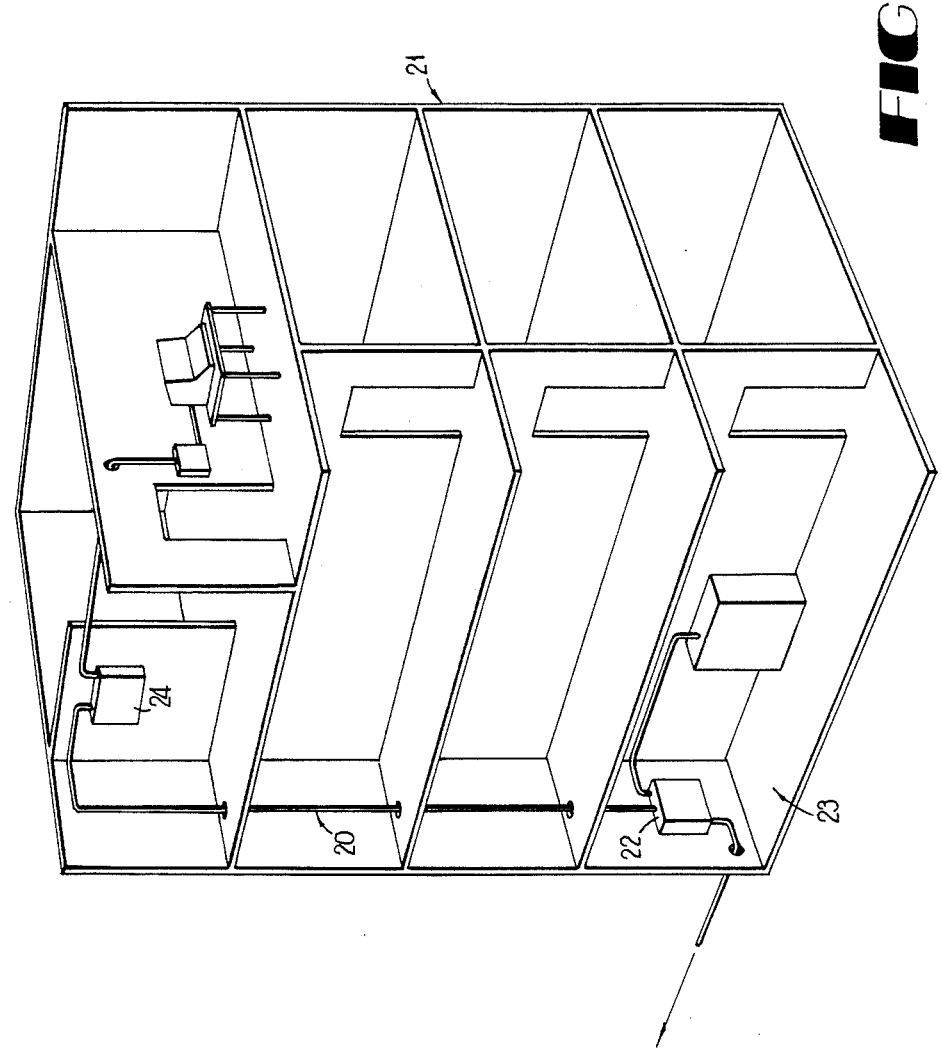

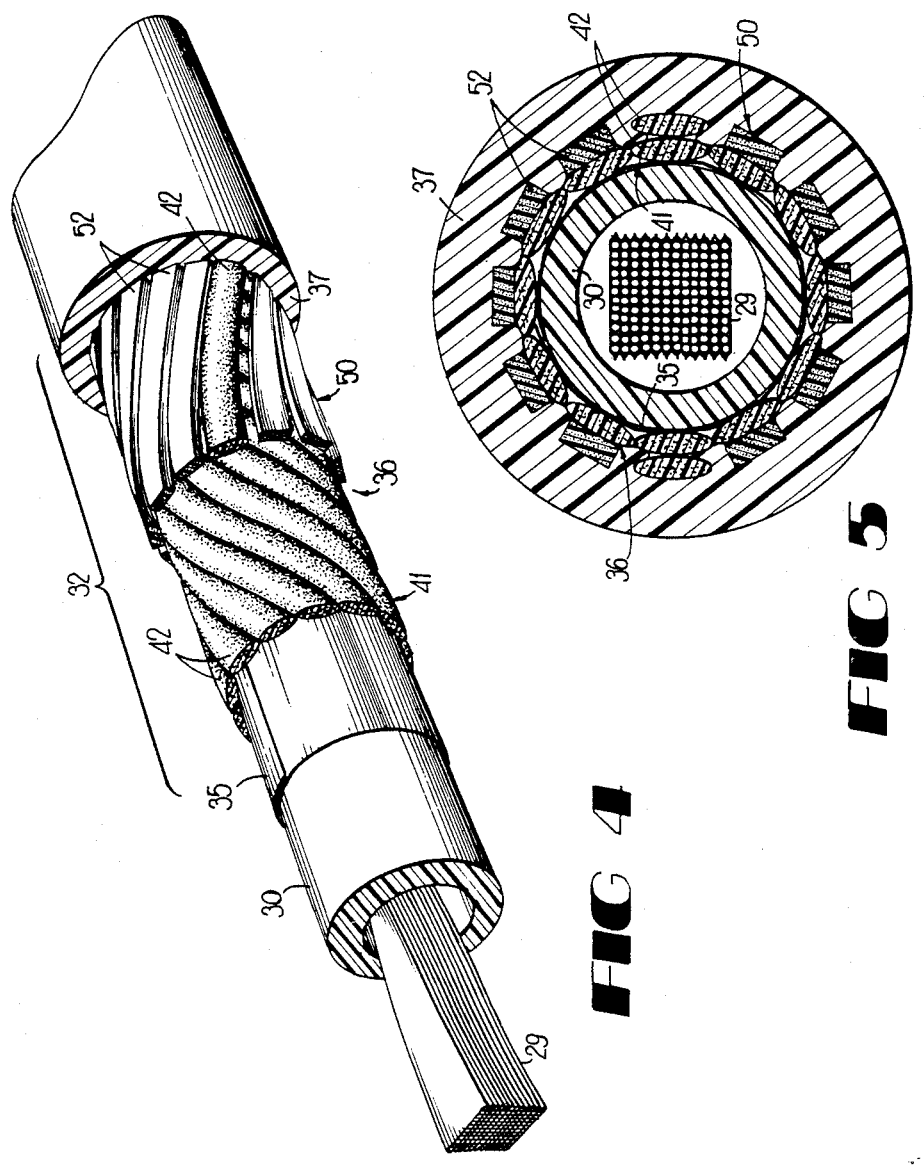

OPTICAL FIBER BUILDING CABLES

TECHNICAL FIELD

This invention relates to optical fiber cables which are suitable for use within and adjacent to buildings such as in risers and plenums. More particularly, this invention relates to an optical fiber cable having a non-metallic tape as part of its sheath system which provides the cable with sufficient resistance to flame spread and smoke evolution to permit its use in buildings.

BACKGROUND OF THE INVENTION

Telephone service to buildings is provided by drop cables whereas that within buildings is provided by riser cables. Typically, cable is pulled within conduit from a manhole to a building over what may be relatively long distances. Riser cables extend upwardly from basement vaults, for example, where they are connected to incoming drop cables to upper foors where they are connected to wiring closets. The vertical distance along which a riser cable is pulled may be considerable. Accordingly, riser cables must have suitable strength characteristics. Also, building cables must be controlled with respect to size.

In order to provide suitable cable strength properties and to achieve a totally dielectric structure, metallic wires of an earlier used cable have been replaced with glass fiber, rod-like members. The rod-like members are capable of withstanding expected compressive as well as tensile loading. Compressive loading occurs when the cable tends to contract during initial shrinkage of the jacket material and during thermal cycling. However, the use of a sufficient number of glass rods to provide the cable with suitable load carrying capability causes the cable to be relatively stiff.

A further consideration is that riser cables must not add substantially to the fuel content available during a conflagration. Also, they must meet National ELectrical Code (NEC) Standards for flame resistance and smoke evolution to minimize the spread of flame and smoke from floor to floor.

Resistance to flame spread and smoke evolution also is a required property for plenum cables. In the construction of many buildings, a finished ceiling, which is referred to as a drop ceiling, is spaced below a structural floor panel that is constructed of concrete, for example. Light fixtures as well as other items appear below the drop ceiling. The space between the ceiling and the structural floor from which it is suspended serves as a return-air plenum for elements of heating and cooling systems as well as a convenient location for the installation of communications cables including those for computers and alarm systems. Such cables extend to the wiring closet on a floor where they are connected to a riser cable.

It is not uncommon for these plenums to be continuous throughout the length and width of each floor. When a fire occurs in an area between a floor and a drop ceiling, it may be contained by walls and other building elements which enclose that area. However, if and when the fire reaches the plenum, and if flammable material occupies the plenum, the fire can spread quickly throughout an entire story of the building. The fire could travel along the length of cables which are installed in the plenum. Also, smoke can be conveyed through the plenum to adjacent areas and to other stories.

Generally, a cable sheath system which encloses a core and which comprises only a conventional plastic jacket does not exhibit acceptable flame spread and smoke evolution properties for use in a riser or in a plenum. As the temperature in such a cable rises, charring of the jacket material begins. Eventually, the charred jacket begins to decompose. If the jacket char retains its integrity, it functions to insulate the core; if not, it exposes the virgin interior of the jacket including the core and other sheath system components within the jacket to elevated temperatures. The jacket and these components therewithin begin to pyrolize and emit flammable gases. These gases ignite and, because of air drafts within the plenum, burn beyond the area of flame impingement, propagating flame and evolving smoke.

As a general rule, the National Electrical Code requires that power-limited cables in plenums and risers be enclosed in metal conduits. The initial cost of metal conduits for communications cables in plenums is relatively expensive. Also, conduit is relatively inflexible and difficult to maneuver in plenums. However, the Code permits certain exceptions to this requirement provided that such cables are tested and approved by an authority such as the Underwriters Laboratories.

The problem of acceptable plenum and riser cable design is complicated somewhat by the trend to the extension of the use of optical fiber transmission media from a loop to building distribution systems. Not only must the optical fibers be protected from transmission degradation, but also they have properties which differ significantly from those of copper conductors and hence require special treatment. Light transmitting optical fibers are mechanically fragile, exhibiting low strain fracture under tensile loading and degraded light transmission when bent. The degradation in transmission which results from bending is known as microbending loss. This loss can occur because of shrinkage during cooling of the jacket and because of differential thermal contractions when the thermal properties of the jacket material differ significantly from those of the enclosed optical fibers.

The prior art includes a plenum cable having a core of copper conductors as shown in U.S. Pat. No. 4,284,842 which issued on Aug. 18, 1981 in the names of C. J. Arroyo, N. J. Cogelia and R. J. Darsey. The core is enclosed in a thermal core wrap material, a corrugated metallic barrier and two helically wrapped translucent tapes. The foregoing sheath system, which depends on its reflection characteristics to keep heat away from the core, it well suited to larger size copper plenum cables. However, for smaller size cables such as optical fiber cables, the use of a heat reflective metallic shield is not only expensive, but is difficult to form about the core.

The prior art also has addressed the problem of cable jackets that contribute to flame spread and smoke evolution through the use of fluoropolymers. In one prior art small size plenum cable, disclosed in application Ser. No. 626,085 filed June 29, 1984, in the names of C. J. Arroyo et al, a sheath system includes a layer of a woven material which is impregnated with a fluorocarbon resin and which encloses a core. The woven layer has an air permeability which is sufficiently low to minimize gaseous flow through the woven layer and to delay heat transfer to the core. An outer jacket of an extrudable fluoropolymer material encloses the layer of woven material.

The use of fluoropolymers, with or without underlying protective layers, for optical fiber building cable jackets requires special consideration of material properties such as crystallinity, shrinkage due to cooling after extrusion, and the magnitude of thermal expansion coefficieints to avoid detrimental effects on the optical fibers. In the absence of special precautions, the shrinkage of fluoropolymer plastic material, which is semi-crystalline, following extrusion may put the optical fiber in compression.

Still other plenum and riser cables may include wrappings of NOMEX ®-KEVLAR ® aramid materials or tapes which may be impregnated with silicone. However, such a wrapping may have a thickness on the order of about 0.050 inch which adds considerably to the overall cable diameter. See U.S. Pat. No. 4,595,793 which issued on June 17, 1986 in the names of C. J. Arroyo and P. D. Thomas.

What has been needed and what has not been provided by the prior art is a cable in which conventional coated optical fibers are enclosed in a relatively uncomplicated sheath system which provides suitable resistance to flame spread and smoke evolution for the optical fiber core. Such a sheath system should be one which does not add substantially to the diameter of the cable and which has suitable strength properties.

SUMMARY OF THE INVENTION

The foregoing problems of the prior art have been overcome by the cable of this invention. The inventive cable includes a core comprising at least one optical fiber which is enclosed in a sheath system. The sheath system includes a fiber glass tape, which is a preferred embodiment is woven and which is impregnated with a suitable heat resistant material which includes a micaceous constituent. In a preferred embodiment, the heat resistant material is a composition of matter comprising a micaceous constituent, a silicone material and a fluorocarbon material such as polytetrafluoroethylene. Over the impregnated fiber glass tape is provided a plastic jacket which is a preferred embodiment comprises a fluoropolymer plastic material. The foregoing described cable may be used as a riser or a plenum cable in a building.

In some building cables including those which provide service to buildings, the cable core is enclosed with a tubular plastic member. The tubular member is enclosed in a non-metallic sheath system which includes the impregnated woven fiber glass tape and a plastic jacket. Interposed between the woven fiber glass tape and the jacket is a layer of strength members. A first plurality of the strength members are relatively flexible and a second plurality of the strength members have sufficient compressive stiffness and are coupled sufficiently to the jacket to provide a composite arrangement which is effective to inhibit contraction of the cable. The first and second pluralities of strength members cooperate to provide the cable with a desired load carrying capability at a strain which does not exceed a predetermined value.

In a preferred embodiment, the strength members are disposed in two layers with an inner layer engaging the fiber glass tape and the outer layer engaging the inner layer. Strength members which are capable of resisting expected buckling forces are disposed in the outermost layer whereas strength members which are relatively flexible and which primarily resist tension are disposed in at least the innermost layer. Preferably, the strength members which are capable of resisting buckling are rod-like and comprised of glass fiber filaments whereas the other strength members are relatively flexible and also are comprised of glass filaments.

Prior art cables have included two layers of glass rod-like strength members separated by an inner plastic jacket. Advantageously, the cable of this invention provides necessary strength requirements by the cooperation between a plurality of rod-like glass fiber members and a plurality of relatively flexible glass fiber members. Further, the cables of this invention do not include an inner plastic jacket between the layers of the strength members.

BRIEF DESCRIPTION OF THE DRAWINGS

Other features of the present invention will be more readily understood from the following detailed description of specific embodiments thereof when read in conjunction with the accompanying drawings, in which:

FIG. 3 is a perspective view of a building which shows cables of this invention placed within the building;

FIG. 4 is a perspective view of another cable of this invention;

FIG. 5 is an end view of the cable of FIG. 4;

DETAILED DESCRIPTION

Figure 2:
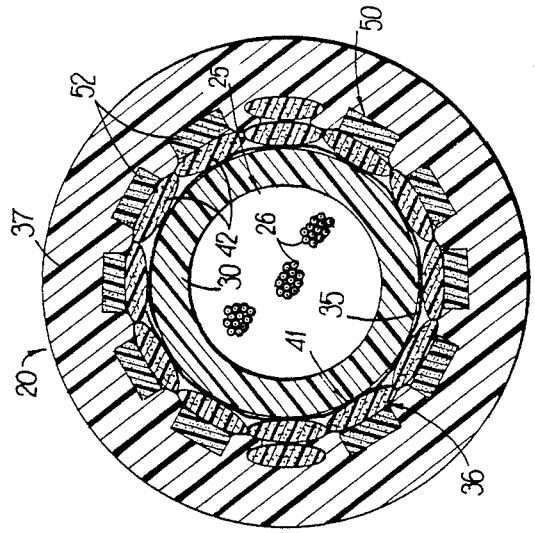
FIG. 2 is an end view of the cable of FIG. 1.
Figure 1:
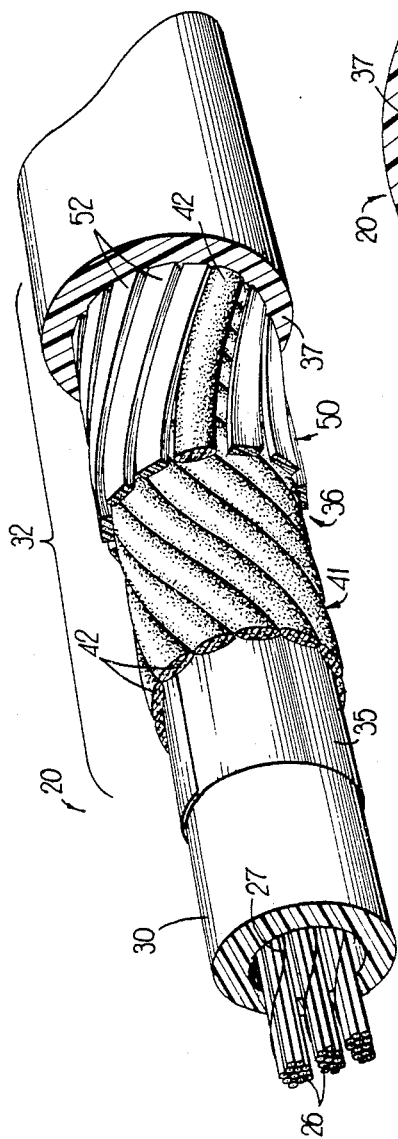
FIG. 1 is a perspective view of an optical fiber cable of this invention.

Referring now to FIGS. 1 and 2, there is shown a cable which is designated generally by the numeral 20. The cable 20 is suited for use as a riser cable in a building 21 (see FIG. 3) to connect between an optical termination closet 22 in an entrance vault 23 in a basement and a wiring closet 24 in an upper floor.

The cable 20 includes a core 29 which includes a plurality of optical fiber units 26—26 each held together by a binder 27. Each unit comprises stranded or non-stranded optical fibers each of which typically comprises a coated optical fiber which may have a buffer coating of polyvinyl chloride (PVC), for example, thereover. The core 25 could just as well include a plurality of optical fiber ribbons 29—29 (see FIGS. 4 and 5). It should be understood that the cable 20 generally will have an outer diameter of about 0.5 inch or less. Although the invention is not limited to such a size cable, optical fiber cables at the present time do not generally exceed that diameter.

Surrounding the core 22 is a tubular member 30. Generally, the tubular member 30 is made of a fire-retardant plastic material such as PVC, for example.

The tubular member 30 is enclosed by a sheath system which is designated generally by the numeral 32. As can be seen in FIGS. 1-2 and 4-5, the sheath system 32 includes a core wrap 35 in the form of a tape, a strength member system 36 and a plastic outer jacket 37.

The core wrap 35 is non-metallic and comprises a fiber glass tape which has been impregnated with a material which enhances significantly the retardance of flame spread and smoke evolution. In such cables, suitable resistance to conductive and convective heat flow must be provided.

In a preferred embodiment, the tape is a woven fiber glass material which also provides strength for the cable 20. Non-woven material could be used for the core wrap tape but it is bulkier than the woven tape and its bulkiness is not needed to hold the impregnating material. Also, it has been found that the woven tape is easier to impregnate. The tape 35 is available commercially such as for example a TEMP-R-GLAS® tape available from the T & F Division of CHR Industries, Inc. The woven glass tape when impregnated with a material having a relatively low thermal conductivity exhibits unexpectedly superior flame and smoke retardant properties and a relatively high dielectric strength.

It has been found that the resistance of the tape 35 to conductive and conventive heat flow is determined by the impregnating material. In a preferred embodiment, the tape 35 is a woven fiber glass tape which has been impregnated with a composition of matter which includes a micaceous constituent. Specifically, the impregnating composition of matter includes mica, silicone, and a fluoropolymer material such as polytetrafluoroethylene (PTEE). Further, the composition includes about 12 to 25% by weight PTEE, about 50-62% of mica and about 25-37% of silicone. In the preferred embodiment, the micaceous constituent comprises phlogopite.

The fluoropolymer and the mica constituents impart heat resistance properties to the composition whereas the silicone functions as a lubricant for the fiber glass. The silicone also causes a slurry which is used to impregnate the woven fiber glass tape to be more aqueous. It has been found that an impregnating material comprising a micaceous constituent together with silicone only results in a somewhat platy material which on the surface of woven glass may break into globs and become very brittle. The fluoropolymer constituent helps to blend the impregnating material into solution so that it won't dry or cure in a platy manner.

The impregnating material imparts unexpectedly superior resistance to conductive and convective heat flow to the cable 20. For example, the K value of the impregnated tape is as low as about 0.000013 cal. $cm/cm^2$ sec °C. This is a significant improvement over the K values of 0.00024 to 0.0004 cal. $cm/cm^2$ sec °C. for tapes shown in earlier mentioned U.S. Pat. No. 4,595,793 which is incorporated by reference hereinto.

It has been found that the tape 35 should be wrapped around the tubular member 30 so as to have a longitudinal seam. An overlapped seam enhances further the fire resistance of the cable.

The preferred embodiment of this invention also is advantageous from the standpoint of size. A woven fiber glass tape which is impregnated with silicone alone generally has a thickness of about 0.007 inch. On the other hand, a fiber glass tape which has been impregnated with a composition of matter comprising a micaceous material, silicone and PTFE may have a thickness as low as 0.003 inch. As should be readily apparent, this thickness is a substantial improvement over that of prior art flame retardant tapes such as the earlier-mentioned NOMEX®-KEVLAR® aramid tape which has a thickness of about 0.050 inch. The tape 35 provides a sheath system having lower thermal conduction and convection values as well as a lower thermal conductivity than other sheath systems which are available commercially.

The jacket 37 encloses the core wrap tape 35. In a preferred embodiment, the jacket 37 comprises a polyvinyl chloride plastic material or a polyvinylidene fluoride material. Typically, the jacket 37 has a thickness of about 0.040 inch.

For building riser cables, cable strength preferably is provided by dielectric strength members comprising KEVLAR® aramid or glass members for example which are interposed between the core wrap 35 and the plastic jacket 37. See Application Ser. No. 867,643 filed on May 28, 1986 in the names of A. C. Jenkins and P. D. Patel.

The strength member system 36 must meet several criteria. First, it must have sufficient strength in compression to resist stresses induced by thermal cycling as well as bending and in tension to resist stresses induced by bending and by pulling. At least portions of the strength member system must be coupled sufficiently to the jacket so that the portions of that strength member system and the jacket provide a composite arrangement which resists buckling. Further, the cable must be relatively flexible, and the cross-sectional shape of the portions of the strength member system must not be overly large.

The strength member system 36 includes an inner first layer 41 (see FIGS. 1-2 and 4-5) of relatively flexible strength members 42—42 which are in engagement with the core wrap 35. Each of the strength members 42—42 comprises a glass fiber member such as a glass roving or yarn marketed by PPG Industries, for example. In a preferred embodiment, each of the strength members 42—42 is a glass roving and is wrapped helically about the core wrap tape 35. Each roving is characterized by a load carrying capability in tension of about 88 lbs. per one percent strain. The load per unit strain is defined as stiffness.

Another component of the strength member system 36 is an outer second layer 50 of strength members which are in engagement with the strength members 42—42 of the inner layer 40. As can be seen in the drawings, each of the majority of the strength members of the outer layer is designated 52 and comprises a relatively inflexible rod-like member which is made of glass fibers in the form of a yarn or roving. Such glass rods are available commercially from the Air Logistics Corp. under the designation E-glass tape. In the embodiment shown in FIGS. 1-2 and 4-5, the outer layer 50 also includes several of the strength members 42—42. For the preferred embodiment, the strength members 52—52 and 42—42 of the outer layer are wrapped helically about the strength members of the inner layer but in an opposite helical direction from those of the inner layer.

Although in the preferred embodiment, the strength member system includes two layers of helically wrapped strength members, other arrangements come within the invention. For example, the strength members of the cable 20 may be assembled to the cable without intended stranding.

Also, the strength members may be disposed in a single layer. This is particularly true in a ribbon core cable in which the outer diameter of the tubular member 30 is larger than for the cables of FIGS. 1 and 2, thereby allowing a greater number of strength members to be disposed about its circumference.

It should be noted that each of the rod-like members 52—52 and the relatively flexible strength members 42—42 of the preferred embodiment comprises a substrate which is made of E-glass fiber filaments. Each substrate may comprise as many as 4000 fiber glass filaments For the strength members 52—52 of the preferred embodiment, the substrate is impregnated with an epoxy material. This causes the substrate to become relatively stiff and is rendered capable of withstanding expected compressive as well as tensile stresses. Expected compressive stresses include those which are induced by thermal cycling, the initial shrinkage of the jacket material, for example. In the preferred embodiment, each strength member 52 is characterized by a tensile stiffness of about 78 lbs. per one percent strain.

For the strength members of the inner layer 41 and for several of the strength members of the outer layer 50 of the preferred embodiment, the glass fiber substrate is a roving and must be treated further to maintain suitable strength properties. Although the glass fibers are sized, the sizing is not sufficient to prevent abrasion among the fibers when they slide relative to one another during tensile loading of the cable 20. Accordingly, in order to prevent a degradation of the tensile strength properties of the roving, it is impregnated with a polyurethane matrix material. Unlike the epoxy material, the polyurethane material does not cause the roving to become relatively inflexible. Instead, it preserves the flexibility and tensile strength of the glass roving while preventing abrasion among the fibers when slippage therebetween occurs. The strength members 42—42 are sufficiently flexible and are sufficient in number to cause the cable 20 to be relatively flexible.

Torque balancing of the cable of FIGS. 1-2 and 4-5 is made easier because the absence of an inner jacket between the layers of the strength members allows the use of the same lay length for the strength members of both layers. Further, a lay length which is longer than that of some prior art cables may be used. This allows the use of higher line speeds during manufacture of the cable.

In order for the cable to have suitable strength characteristics, the strength member system 36 must be coupled to the jacket 37. It should be understood that the plastic of the outer jacket encapsulates portions of the strength members and couples thereto. If the coupling of the strength members to the jacket is excessive, bending of the cable could result in buckling of the strength members with respect to the jacket 37. Therefore, provisions must be made for controlling the coupling of the strength members to the jacket 37.

The arrangement of FIGS. 1-2 and 4-5 also is effective to control any coupling between the strength members and the jacket 37. Portions of the strength members are sufficiently inaccessible for coupling with the plastic jacket 37. Portions of the strength members of the inner layer which engage the core tube 30 and the portions of the strength members of each layer which engage each other are not embedded in plastic material and hence are decoupled from the jacket. As a result of this arrangement, a slippage plane is provided for the plurality of longitudinally extending strength members which are disposed along the tubular member 30.

During manufacture, the strength members are caused to be disposed about the tape 35 under tension so that portions of the surfaces of the strength members make intimate surface contact with the core wrap tape and with each other. Then, the jacket 37 is pressure-extruded over the strength members. The contact between the inner layer 41 of strength members and the core wrap and between the inner and outer layers of strength members is such as to inhibit the flow of the jacket plastic extrudate to the portions of the surfaces so that encapsulation of these surfaces is prevented. This reduces jacket-strength member coupling sufficiently so that the strength members can more readily slide with respect to the jacket during local cable bending.

Preventing encapsulation of these surfaces has little effect on the reinforcing tensile strength of the strength members. When the extruded plastic material of the jacket 37 cools during manufacture, it forms a tight fit about at least some of the strength members. During tensile loading of the cables, the helically wrapped strength members attempt to move radially but are prevented from doing so by the underlying tubular member 30. For the strength members which engage the tape 35 in a single layer system or for those of the outer layer which engage the inner layer, the jacket forms generally a split-type ring. This arrangement substantially mitigates against relative circumferential movement of the strength members with respect to the jacket, and more easily allows relative movement of the strength members in a longitudinal direction with respect to the jacket under local bending.

Sufficient coupling exists between strength members of the cable of this invention and the jacket 37 to ensure composite structural behavior between those strength members and the jacket in a longitudinal direction over the complete length of the cable. Such coupling is established with the strength members immediately adjacent to the jacket 37. Therefore, in order to provide the cable of the preferred embodiment with suitable compressive strength, it is important that the relatively inflexible strength members 52—52 are disposed in the outer layer 50 and contiguous to the jacket 37. This arrangement allows the strength members 52—52 to become coupled sufficiently to the jacket 37 so that those strength members and the jacket provide a composite arrangement which is effective to inhibit contraction of the cable. Contraction of the cable may occur during initial shrinkage of the plastic jacket material and during exposure to temperatures which may be as low as −40° F. If only the relatively flexible strength members 42—42 were contiguous to the jacket 37, the composite arrangement of them and the jacket may not be effective to withstand expected buckling forces.

The cable of this invention is such that it can withstand a 600 lb load at a strain which does not exceed 0.33%. One prior art cable includes two layers of strength members with the layers being separated by an inner jacket and with all the strength members being relatively stiff glass rods. Because the cable 20 of this invention includes a plurality of relatively flexible glass fiber members in the inner layer in a somewhat undulated configuration longitudinally of the cable, portions of a tensile load are not immediately taken up by them but only after they are taut. As a result, a curve 53 (see FIG. 6) which depicts the relationship of load and strain for the cable of this invention includes a portion 54 which has a slope that is less than that of a curve 55 for the prior art cable. In order to prevent the strain at a 600 lb loading from exceeding 0.33%, the remainder of the curve 53, that is a portion 56, has a slope greater than that of the portion 54 and greater than that of the curve 55 for the prior art cable.

Figure 6:
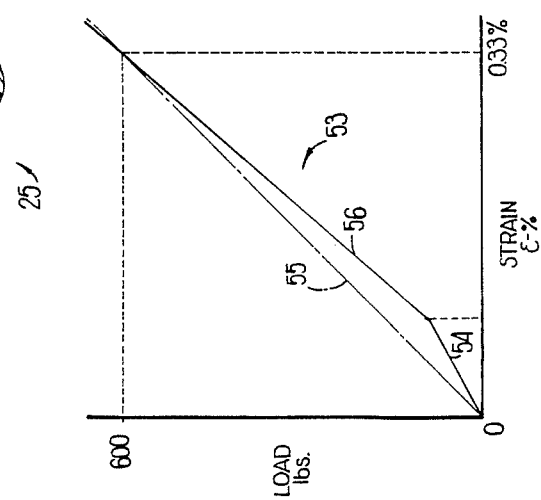
FIG. 6 is a graph which shows curves of force plotted against strain for a prior art cable and for one embodiment of a cable of this invention.

It should be noted that the force-strain curves characteristic of the cables of this invention need not include a knee as shown in FIG. 6. The relative numbers of the two kinds of strength members may be optimized with respect to sufficient strength characteristics as well as flexibility. For example, the number of relatively stiff strength members 52—52 may be increased sufficiently to cause the force-strain curve to be similar to the curve 55. Of course, such a cable would include a plurality of strength members 42—42, although not as many as shown in FIGS. 1-2 and 4-5, to impart flexibility to the cable.

In the preferred embodiment of this invention, inner and outer diameters of the core tube are about 0.17 inch and 0.24 inch, respectively, whereas inner and outer diameters of the outer jacket are about 0.32 and 0.42 inch, respectively. The inner layer 40 includes twelve rovings 42—42 and the outer layer 50 includes two rovings 42—42 and ten glass rod-like members 52—52 with all of the members being equally spaced about the cable periphery. Also, in the preferred embodiment, the two rovings 42—42 in the outer layer 50 are diametrically opposite to each other.

Figure 7:
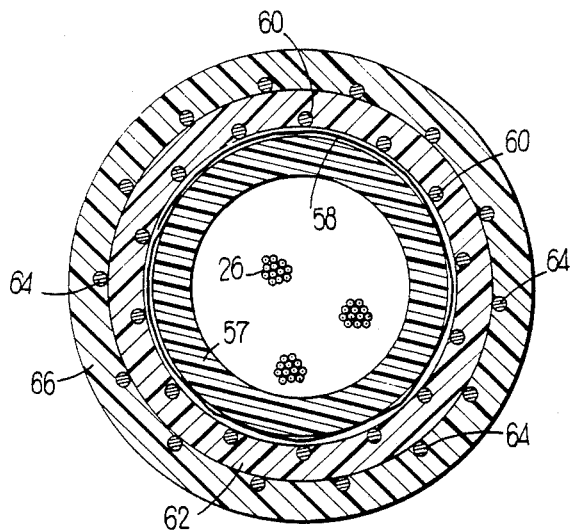
FIG. 7 is an end view of another embodiment of a cable of this invention.
Figure 8:
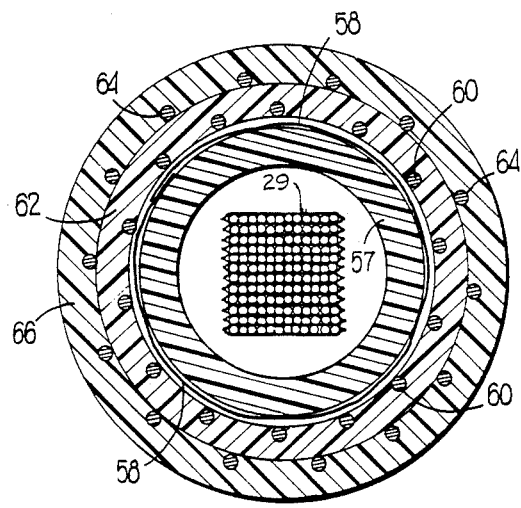
FIG. 8 is an end view of still another embodiment of a cable of this invention.

Although the core wrap 35 for larger pair size riser cables is used in cable structures having all dielectric strength member systems, it may be used in other arrangements. Such arrangements are shown in FIGS. 7 and 8. The sheath systems in FIGS. 7 and 8 are identical. Whereas an optical ribbon core similar to that in FIGS. 4 and 5 is shown in FIG. 8, a plurality of units of optical fibers, each being bound is included in FIG. 7. Therefore, the same numerals are used to designate elements of the cables of FIGS. 7 and 8.

Each cable in FIGS. 7 and 8 includes a tubular member 57 which encloses the core. The tubular member 57 may be made of a plastic material such as PVC, for example. Over the tubular member is disposed a core wrap 58 which includes an impregnated fiber glass tape such as the core wrap tape 35 of FIGS. 1-2 and 4-5.

About the tape 58 is disposed a first layer of metallic strength members 60—60 such as stranded steel wires and an inner jacket 62. A second layer of metallic strength members 64—64 is wrapped about the inner jacket 62 and enclosed by an outer plastic jacket 66. The inner and outer plastic jackets 62 and 66, respectively, may be made of a PVC or a fluoropolymer material. The wrappings of metallic strength members is shown, for example, in U.S. Pat. No. 4,241,979 which issued on Dec. 30, 1980 in the names of P. F. Gagen and M. R. Santana.

Normally, a run extends with an outside cable having unbuffered fibers from a manhole to a building vault where it is spliced to a building riser cable in the terminaion closet 22. On upper floors the riser cable is spliced to plenum cables. With the cable of this invention, a run may be made directly from the manhole to an upper level wiring closet, bypassing the termination closet 22 and eliminating a splice. The core wrap 35 provides the necessary resistance to flame spread and smoke evolution inside the building.

Figure 9:
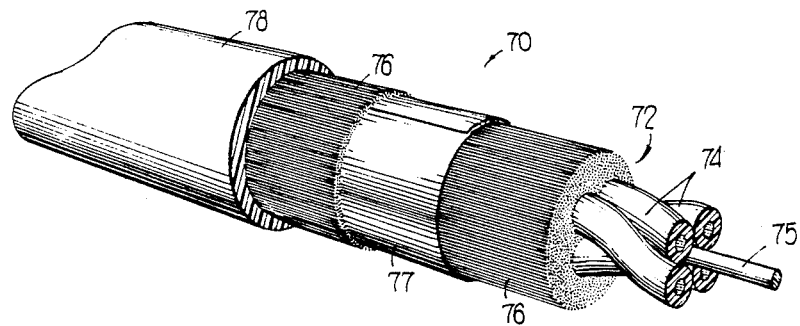
FIG. 9 is a perspective view of a riser optical fiber cable of this invention.
Figure 10:
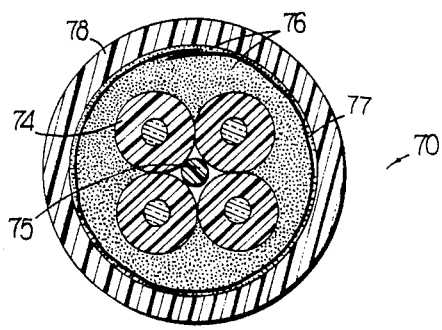
FIG. 10 is an end view of the optical fiber cable of FIG. 9.

In FIGS. 9-10 is shown a cable 70 which includes a core 72 and which is another embodiment of a riser cable comprising a plurality of buffered coated optical fibers 74—74 which are wrapped helically about a central strength member 75 which may be made of glass or KEVLAR ® aramid fiber yarn. The core 72 may be filled with strength member yarn such as KEVLAR ® yarn 76 for example and enclosed with a core wrap 77, which comprises an impregnated tape such as the tape 35. The core wrap is enclosed with a plastic jacket 78 such as one made of a fluoropolymer material. Additional strength member yarn is interposed between the core wrap 77 and the plastic jacket 78.

Figure 11:
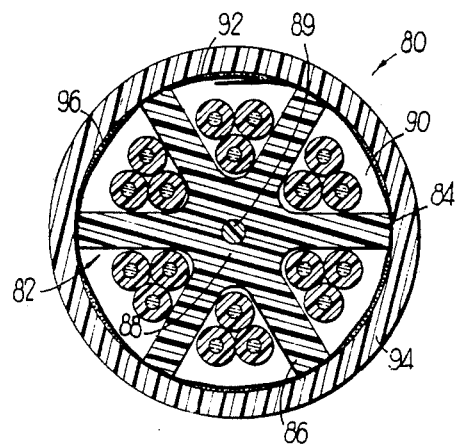
FIG. 11 is an end view of a fluted plenum optical fiber cable.

As was mentioned earlier hereinbefore, a cable which includes the core wrap of this invention also is ideally suited as a plenum cable. In FIG. 11, there is shown a fluted plenum cable 80. The cable 80 includes a core 82 comprising a flute 84 having ribs 86—86 extending radially from a center portion 88 which may include a central strength member 89. The flute 84 may be made of a flame retardant material such as PVC, for example, whereas the central strength member is made of glass or KEVLAR ® yarn, for example. Between each two adjacent ribs 86—86 is formed a groove 90 for receiving buffered or unbuffered, coated optical fibers. About the fluted core 82 is disposed a core wrap 92 which comprises an impregnated fiber glass tape such as the tape 35. Over the core wrap 92 is extruded a plastic jacket 94.

The flute 84 is made of a plastic material such as polyvinyl chloride or a fluoropolymer. The flute 84 may be twisted so that the optical fibers which are positioned in the grooves have a lay.

It should be observed that between the core wrap 92 and the plastic jacket 94 is located a layer 96 of strength member yarn such as KEVLAR ® aramid yarn, for example. This yarn is used to anchor the cable 80 after the jacket is removed.

Because the plenum cable 80 has strength properties, in addition to its resistance to flame spread and smoke evolution, it may be extended from a building plenum into a riser. Advantageously, this avoids the need for connections within a wiring closet on a building floor wherein typically a plenum cable is connected to a riser cable.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber cable, which comprises:
   an optical fiber core;
   a core wrap comprising a fiber glass tape which after having been impregnated with a fire-retardant material which includes a composition comprising a micaceous constituent, a fluoropolymer constituent and silicone has been wrapped about said core to protect said core against thermal decomposition; and
   a plastic jacket which enclose said core wrap.

2. The optical fiber cable of claim 1, wherein said composition comprises about 12 to 25 percent by weight of polytetrafluoroethylene, about 50 to 62% by weight of mica and about 25 to 37% by weight of silicone.

3. The optical fiber cable of claim 1 which also comprises a tubular member, which is disposed between said core and said core wrap and which is made of a plastic material, and further comprises a strength member system which is interposed between said core wrap and said jacket and which comprises strength members made of a dielectric material with a first plurality of said strength members being relatively flexible and with a second plurality thereof having sufficient compressive stiffness and being coupled sufficiently to said jacket to provide a composite which is effective to inhibit contraction of said cable, said first and second pluralities of strength members cooperating to provide said cable with a predetermined tensile stiffness.

4. The optical fiber cable of claim 1, wherein said core includes a fluted strength member which comprises a plurality of ribs extending radially from a central portion and a plurality of grooves each of which is disposed between two adjacent ribs with at least one optical fiber disposed in at least one of said grooves.

5. An optical fiber cable, which comprises:
a core comprising at least one optical fiber;
a tubular member which is made of a plastic material and which encloses said core;
a core wrap which comprises a fiber glass tape impregnated with a material which includes a micaceous constituent, said core wrap being disposed about said tubular member;
a jacket which is made of plastic material; and
a strength member system which is disposed between said core wrap and said jacket and which is effective to provide said cable with a predetermined tensile stiffness, said strength member system comprising:
an inner layer of longitudinally extending strength members which are made of a dielectric material; and
an outer layer of longitudinally extending strength members which are made of a dielectric material and which engage said first layer of strength members and said jacket, with a plurality of the strength members of said outer layer having sufficient compressive stiffness and being coupled sufficiently to said jacket to provide a composite arrangement which is effective to inhibit contraction of said cable and with the remaining strength members being relatively flexible.

6. The optical fiber cable of claim 5, wherein said material with which said tape is impregnated comprises a micaceous constituent, polytetrafluoroethylene and silicone.

7. The optical fiber cable of claim 6, wherein said micaceous constituent is phlogopite.

8. The optical fiber cable of claim 6, wherein said composition comprises about 12 to 25 percent by weight of polytetrafluoroethylene, about 50 to 62% by weight of a micaceous constituent and about 25 to 37% by weight of silicone.

9. The optical fiber cable of claim 5, wherein each of said relatively flexible strength members comprises a glass roving having a tensile stiffness of about 88 lbs. per 1% strain.

10. The optical fiber cable of claim 5, wherein each of said strength members of said inner layer comprises a glass fiber roving which has been impregnated with a polyurethane material and wherein a plurality of the strength members of said outer layer are relatively inflexible and is rod-like and is made of a glass material which has been impregnated with an epoxy material.

11. The optical fiber cable of claim 5, wherein said strength members are such that said cable is capable of being loaded with about 600 lbs at a strain which does not exceed about 0.33%.

12. The optical fiber cable of claim 5, wherein each of said strength members of said inner layer is wrapped helically about said tubular member.

13. The optical fiber cable of claim 12, wherein each of said strength members of said inner layer has a lay length of about 12.5 inches.

14. The optical fiber cable of claim 12, wherein each of said strength members of said outer layer is wrapped helically about said inner layer of strength members.

15. The optical fiber cable of claim 14, wherein each of said strength members of said outer layer has a lay length of about 12.5 inches.

16. The optical fiber cable of claim 14, wherein said inner and outer layers are wrapped helically about said tubular member in opposite directions.

17. The optical fiber cable of claim 5, wherein each of said strength members is caused to be disposed about said core without intended stranding.

* * * * *